March 17, 1942.    H. HOOVER, JR., ET AL    2,276,306
SYSTEM FOR MAKING WEATHERING CORRECTIONS
Filed July 26, 1939
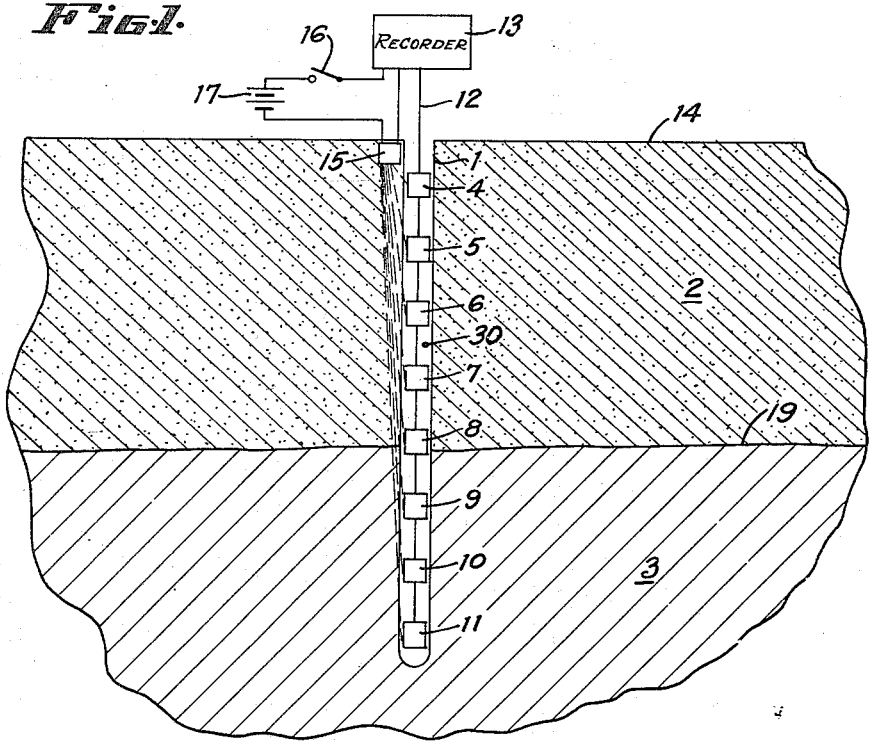
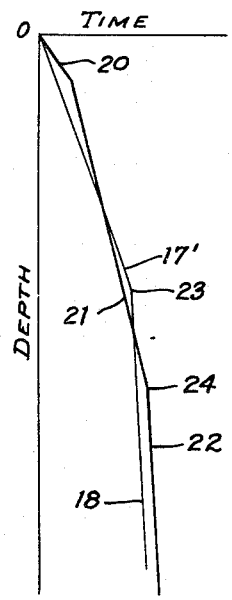
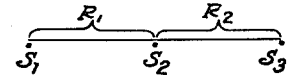
INVENTORS
HERBERT HOOVER JR.
HUGH C. SCHAEFFER
BY
Lippincott & Metcalf
ATTORNEYS.

Patented Mar. 17, 1942

2,276,306

UNITED STATES PATENT OFFICE 2,276,306

SYSTEM FOR MAKING WEATHERING CORRECTIONS

Herbert Hoover, Jr., Sierra Madre, and Hugh C. Schaeffer, Tulare, Calif., assignors, by direct and mesne assignments, to Consolidated Engineering Corporation, Pasadena, Calif., a corporation of California Application July 26, 1939, Serial No. 286,647

8 Claims. (Cl. 181—0.5)

Our invention pertains to seismic prospecting and in particular to a system for determining the thickness of a "weathered" layer and the time required for seismic waves to pass through any section thereof.

In conducting seismic explorations, determinations of dip and/or depth of subterranean beds are obtained. To make such dip and/or depth determinations various special techniques are available, but all of the methods used in practice have one factor in common, namely, the determination of wave travel times from a source of seismic waves to various receptors. Depth points and dips are determined by comparison of such wave travel times by methods well known in the art. When making computations of depth or dip based on wave travel times, certain correction times are ordinarily applied in order to compensate for errors that might otherwise arise from variations in surface velocity or the thickness of the weathered layer. We have found that the weathering correction techniques heretofore used have involved certain errors arising because of failure to take into account variations in the thickness of the weathered layer at the respective receptor stations, as well as variation in the time required for waves to travel through the weathered layer at various receptor positions.

The principal object of our invention is to overcome the objections to previous methods by providing a method for determining both the thickness of a weathered layer and the time required for waves to travel therethrough.

Another object of our invention is to provide a system for making weathering corrections in which a plurality of receptors placed in a bore hole near the surface of the earth are used to record seismic waves generated at a point alined with the bore hole.

Another object is to provide a system for locating the bottom of the weathered layer at a plurality of horizontally spaced shot points to facilitate the selection of optimum shooting depths at the respective shot points.

Another object is to provide a system for locating the bottom of the weathered layer and the time required for waves to travel therethrough at a plurality of horizontally spaced shot points to facilitate making accurate determinations of dip.

Another object is to determine vertical travel times in the weathered layer.

Another object is to provide a method for determining the velocity of waves in or beneath the weathered layer.

Our invention possesses numerous other objects and features of advantage, some of which, together with the foregoing, will be set forth in the following description of specific apparatus embodying and utilizing our novel method. It is therefore to be understood that our method is applicable to other apparatus, and that we do not limit ourselves, in any way, to the apparatus, of the present application, as we may adopt various other apparatus embodiments, utilizing the method, within the scope of the appended claims.

Referring to the drawing:

Figure 1 is a sectional view of a part of the earth to which our invention is applied.

Figure 2 is a time depth graph obtained in accordance with our invention.

Figure 3 is a plan view of an area explored by one form of our invention.

Broadly speaking our invention comprises obtaining a time-depth curve for the upper portion of the earth's surface and determining from said graph both the depth to interface near the earth's surface and the time required for seismic waves to travel from said interface to the surface. Our invention is simple to apply and as will appear to those skilled in the art, makes possible increased accuracy in the exploration of subsurface structures.

Referring to Fig. 1 we drill a substantially vertical bore hole to such a depth that the hole passes through the weathered layer 2 and penetrates a subweathered layer 3. Our problem is to locate an interface 19 at the bottom of weathered layer 2 and to measure the time required for seismic waves to travel through all or any portion of the weathered layer along a substantially vertical path.

We lower a string of receptors 4 ... 11 preferably closely spaced at known uniform depths throughout the length of the drill hole 1. Preferably said receptors should be about five feet apart if the weathered layer thickness is fifty or a hundred feet, but may be spaced closer or further apart if the expected thickness of the weathered layer varies appreciably from this amount.

If desired, the uppermost receptor may be at the surface of the earth in a position to be occupied by a receptor during the reception of reflected seismic waves in the regular course of seismic prospecting.

If the approximate depth of the bottom of the weathered layer is known, such as from previous measurements at neighboring drill holes, a plurality of spaced receptors may be strung both above and below the approximate expected position of the interface 19 instead of throughout the entire length of the drill hole. Said receptors are supported by a multiconductor cable 12 which connects the receptors to separate recording elements of a recorder 13.

The receptors are acoustically coupled to the walls of the drill hole 1 such as by immersion in mud or by utilizing mechanical contact between the receptors and the drill hole wall.

At some point in or near the hole 1 preferably at or just below the surface 14, we place a small charge of explosive 15 which is connected to a recording element of the recorder 13 through the key 16 and battery 17. Upon closing key 16, charge 15 is detonated and an indication of the firing instant produced on a record strip in recorder 13 according to principles well known in the art. Impulses imparted to the ground by charge 15 travel downward and reach receptors 4 ... 11, after time intervals determined by the depths of the receptors and wave velocities in the weathered layer 2 and the subweathered layer 3. When the waves from shot 15 reach the various receptors indications corresponding to the wave arrival times are produced on a record within recorder 13.

We examine the record produced and determine therefrom the travel time from the shot 15 to the respective receptors. These time intervals may be plotted as abscissae against the receptor depths as ordinates and a graph such as that shown in Fig. 2 obtained.

The early portion 17 of the graph shown, corresponding to arrival times at receptors 4 ... 8, forms a straight line of comparatively large slope. This indicates that the weathered layer 2 consists of a material of uniform low velocity, which is normally about 2,000 feet/second or less. The later portion of the graph 18 may be more nearly vertical, indicating almost simultaneous arrival of the waves at receptors 9, 10, and 11. This is due to the fact that the subweathered layer 3 normally has a comparatively high velocity of about 6,000 feet per second or more. From the coordinates of the intersection 23 of the two lines 17 and 18 we determine the depth of the bottom 19 of the weathered layer, and the time for waves to travel vertically therethrough.

It may so happen that the graph obtained has three straight line sections including lines 20, 21, and 22. The point of intersection which may be of chief interest in this case may be that point 24 which indicates arrival of waves at a high velocity layer beneath the surface.

In another form of our invention the shot may be fired at some depth below the surface such as at a point 30 intermediate receptors 6 and 7. This shot may obviously be in an adjacent hole if desired. When the shot is detonated at point 30, the time for the waves to travel to the uppermost receptor and the time required to travel to the bottom 19 of the weathered layer may be added together to obtain an indication of the time required for waves to travel through the weathered layer.

It may so happen that the portion of the earth's crust lying above an interface 19 of interest, is not a single low velocity layer as illustrated in Fig. 1, but may include a high velocity layer bounded by low velocity layers on both the top and bottom thereof. In this case the procedure illustrated in Fig. 1 will produce a different time depth graph from either of those shown, but will still make possible ascertaining both the position of the interface 19 and the time required for waves to travel from the surface to the top of the high velocity layer 3. Other conditions to which our invention is especially suited will readily occur to those skilled in the art.

From a knowledge of the depth of the weathered layer, and the time required for waves to travel therethrough we are able to make more accurate determinations of subsurface structural relief than would otherwise be possible.

In addition to the foregoing advantages, a knowledge of the weathered layer thickness makes possible the placement of shots at optimum depths with respect to the bottom of the weathered layer and thereby enables us to generate seismic waves of substantially uniform or optimum character at successive shot points along a line of exploration.

Thus referring to Fig. 3, we have shown by way of example a plan view of a succession of setups to which our invention may be applied. Here $S_1$, $S_2$, and $S_3$ represent shot hole positions and $R_1$ and $R_2$ represent lines along which spreads of receptors are laid out. According to our invention we determine the thickness of the weathered layer at successive horizontally spaced shot points by the method hereinabove explained. Using one of the receptor spreads, say $R_1$ and one of the shot points $S_2$, we produce a succession of records for waves generated at various depths below the bottom of the weathered layer. By comparison of the records we select a shooting depth suitable for the production of a legible record. Then in making other records in the same area we shoot at the same depth below the bottom of the weathered layer.

Thus it is seen that our invention provides a method for ascertaining complete and accurate data regarding a weathered layer and accordingly makes accurate weathering corrections possible in seismic prospecting and the production of similar records from one setup to another.

We claim:

1. The method of obtaining data for making weathering corrections in an area where a weathered layer and a contiguous subweathered layer have different seismic wave velocities on opposite sides of the interface separating the layers, which comprises the steps of generating at a point adjacent the surface a seismic wave which travels through the weathered layer into the subweathered layer along a path which is substantially perpendicular to the interface separating the two layers, receiving the wave at a plurality of spaced points within the layers at known depths, and measuring the time elapsed between the instant of wave generation to the instant of wave reception at each of the reception points, whereby the location of the bottom of the weathered layer and the time required for the wave to travel therethrough may be determined from a discontinuity in the relationship between wave-travel time and reception point depth.

2. The method of obtaining data for making weathering corrections in an area where a weathered layer and a contiguous subweathered layer have different seismic wave velocities on opposite sides of the interface separating the layers, which comprises the steps of generating at the surface a seismic wave which travels through the weathered layer into the subweathered layer along a path which is substantially perpendicular to the interface, receiving the wave at a plurality of spaced points at known depths beneath the surface on a line which is substantially normal to the interface, which line intersects the interface between end reception points on the line, with each end reception point in one of the layers, and measuring the time elapsed between the instant of wave generation to the instant of wave reception at each of the reception points, whereby the location of the bottom of the weathered layer and the time required for the wave to travel therethrough may be determined from a discontinuity in the relationship between wave-travel time and reception point depth.

3. The method of obtaining data for making weathering corrections in an area where a weathered layer and a contiguous subweathered layer have different seismic wave velocities on opposite sides of the interface separating the layers, which comprises the steps of generating at a point in one of the layers a seismic wave which travels through the interface into the other layer along a path which is substantially perpendicular to the interface, receiving the wave at a plurality of spaced points within the layers, at known depths beneath the surface of the earth, and measuring the relative time of arrival of the wave at the respective reception points, whereby the depth of the interface may be determined from a discontinuity in the relationship between the relative times of arrival and the reception points depths.

4. In a method of locating the interface separating two contiguous geological layers having different characteristic seismic wave velocities on opposite sides of the interface, the improvement which comprises the steps of generating a seismic wave which travels substantially perpendicularly through the interface and through at least part of each layer on each side of the interface, receiving the wave in each layer at a plurality of alined points located at known positions, and measuring the relative times of arrival of the wave at the respective reception points.

5. In a method of locating the interface separating two contiguous geological layers having different characteristic seismic wave velocities on opposite sides of the interface, the improvement which comprises the steps of generating a seismic wave which travels along a path which is substantially perpendicular the interface and through at least part of each layer on each side of the interface, receiving the wave at a plurality of spaced points lying within the layers at known positions on a line which is substantially normal to the interface and which intersects the interface between end reception points on the line, and measuring the relative times of arrival of the wave at the respective reception points.

6. A method of locating the interface separating two contiguous geological layers having different characteristic seismic wave velocities on opposite sides of the interface, the improvement which comprises the steps of generating a seismic wave which travels through at least part of each layer on the respective sides of the interface, receiving the wave at a plurality of points lying within the layers at known positions on a line which extends through the interface, and measuring the relative times of arrival of the wave at the respective reception points, whereby differences in the velocity with which the wave travels through the earth at the respective reception points may be determined from the relationship between reception point positions and wave arrival times, and a distinction thereby made between reception points lying in the different layers.

7. In the art of seismic prospecting in an area covered by a weathered layer of variable thickness, the method of producing legible records which comprises locating the bottom of the weathered layer at a point in the area under investigation, successively generating a set of seismic waves at each of various known depths beneath the bottom of the weathered layer at that point, receiving each of the sets of waves at a plurality of horizontally spaced points, separately recording each set of received waves to produce a separate record corresponding to each of the depths at which the respective sets of waves have been generated, comparing the records to determine the optimum depth below the weather layer at which to produce a legible record, thereafter successively generating other sets of seismic waves at different generating points in the same area at said optimum depth below the bottom of the weathered layer at the respective generating points to produce waves of substantially uniform character at the respective generating points, and separately receiving and recording each of these other sets of seismic waves at horizontally spaced reception points.

8. In the art of seismic prospecting in an area covered by a weathered layer of variable thickness, the method of producing legible records, which comprises locating the bottom of the weathered layer at a plurality of spaced generating points, successively generating sets of waves at different horizontally spaced points at depths which are substantially uniformly spaced vertically with respect to the bottom of the weathered layer at the respective points to produce sets of seismic waves having substantially uniform character at the respective generating points, receiving each set of seismic waves at spaced reception points at the surface after traveling through the earth, and recording the received waves.

HERBERT HOOVER, Jr.
HUGH C. SCHAEFFER.